United States Patent [19]

Omote et al.

[11] Patent Number: 5,735,770
[45] Date of Patent: Apr. 7, 1998

[54] CONTROL SYSTEM FOR VEHICULAR DRIVE UNIT

[75] Inventors: Kenji Omote, Nishio; Shigeo Tsuzuki, Takahama, both of Japan

[73] Assignee: Aisin AW Co., Ltd., Anjo, Japan

[21] Appl. No.: 754,996

[22] Filed: Nov. 22, 1996

[30] Foreign Application Priority Data

Dec. 8, 1995 [JP] Japan ................................. 7-345919

[51] Int. Cl.$^6$ ................................................ F16H 61/00
[52] U.S. Cl. ................................................................ 477/5
[58] Field of Search ............................................ 477/2, 5

[56] References Cited

U.S. PATENT DOCUMENTS

| | | |
|---|---|---|
| 3,732,751 | 5/1973 | Berman et al. |
| 5,024,633 | 6/1991 | Schmidt ........................... 477/2 |
| 5,258,651 | 11/1993 | Sherman. |
| 5,285,111 | 2/1994 | Sherman. |
| 5,415,603 | 5/1995 | Tuzuki et al. ........................ 477/5 |
| 5,492,189 | 2/1996 | Kriegler et al. ..................... 477/2 |

FOREIGN PATENT DOCUMENTS

50-30223  3/1975  Japan.

*Primary Examiner*—Dirk Wright
*Attorney, Agent, or Firm*—Oliff & Berridge, PLC

[57] ABSTRACT

A control system for a vehicular drive unit including an engine 1, a motor/generator 2, a transmission 4, and a planetary gear 30 connected to the engine through a starting clutch 31 and to the motor/generator and the transmission. The control system includes a motor drive control acting as a program in an ECU 70 for driving the motor/generator in a predetermined direction prior to the application of the starting clutch at a split starting time of a vehicle, when the starting clutch is applied to interlock the engine and the motor/generator through the planetary gear to output a reaction of an engine output torque to the motor/generator.

9 Claims, 8 Drawing Sheets

| | C0 | C2 | B0 | B1 | B3 | F0 | F2 | REMARKS |
|---|---|---|---|---|---|---|---|---|
| P, N | × | × | × | × | × | × | × | |
| R | ○ | × | × | × | ○ | ○ | × | |
| D 1st Speed | ○ | × | × | × | (○) | ○ | ○ | 1st Speed in D-Range |
| D 2nd Speed | ○ | × | × | ○ | × | ○ | × | |
| D 3rd Speed | ○ | ○ | × | × | × | ○ | × | |
| D 4th Speed | × | ○ | ○ | × | × | × | × | |

Without Shift Control

Inertia Torque
$Ti = Im\omega$

FIG. 7(b)

With Shift Control

CONTROL SYSTEM FOR VEHICULAR DRIVE UNIT

BACKGROUND OF THE INVENTION

1. Field of the Invention

The invention relates to a vehicular drive unit and, more particularly, to a control system for the vehicular drive unit in which a combustion engine (as will be abbreviated to an "engine") and an electric motor and electric generator (as will be abbreviated to a "motor/generator") are combined.

2. Description of the Related Art

In recent years, various countermeasures have been made to improve the mileage and purify the exhaust gas in the vehicular drive unit. One of them is a hybrid power transmission in which the engine and the motor/generator are combined. The motor/generator functions as an electric motor, as energized by the battery power source, to aid in the engine output at an acceleration time when the vehicle driving load is serious for the engine output. On the other hand, the motor/generator functions as a power generator to store the excess of the engine output as an electric energy at a deceleration time when the engine output is excessive or over the vehicle driving load.

As one mode of the hybrid power transmission, there is disclosed in Japanese Patent Laid-Open No. 30223/1975 a system in which the engine and the motor/generator are connected to the output shaft through a planetary gear. This transmission can realize, as one driving control mode mainly for starting and accelerating the vehicle, a split mode in which the reaction of the output torque of the engine is outputted by the motor/generator so that the torque according to the reaction is outputted to the output shaft to propel the vehicle by the torque balance of the planetary gear.

Incidentally, in the prior art, the torque of the engine in an idling state is transmitted to the planetary gear by applying a starting clutch when the vehicle is split-started from a stopping state by an N-D shifting operation of the driver. At this application time of the starting clutch, however, the RPM of the motor/generator has to be raised by a single action from the stopped state of 0 rotation to a predetermined RPM of torque balance. However, this abrupt rise in the rotation is impossible because of the inertial mass of the rotor of the motor/generator. As a result, the inertia torque of the RPM difference accompanying the application of the starting clutch is transmitted to the output shaft to cause shift shocks. Furthermore, when this inertia exceeds the output torque of the engine, an engine stall is invited.

The countermeasures for suppressing the inertia torque will be discussed in connection with the general automatic transmission of the prior art. The ordinary automatic transmission suppresses the inertia torque to reduce the shift shocks at the starting time by regulating the application pressures with accumulators, orifices, control valves (linear solenoid valve, duty solenoid valve, timing valve and relay valve) in the hydraulic circuit to apply the clutches gradually for a predetermined time period which can be allowed to give no operation delay to the driver. If, however, this technique is applied as it is to the hybrid power transmission, an application time period for suppressing the inertia torque within a similar value has to be set to a considerably large value thereby delaying the start of the vehicle. This occurs because the inertia mass around the rotor of the motor/generator is far larger than that around the clutch of the ordinary automatic transmission.

SUMMARY OF THE INVENTION

It is, therefore, a first object of the invention to provide a control system for a vehicular drive unit having an engine and a motor/generator, which can reduce the application shocks of a starting clutch without elongating the time period required for the application.

A second object of the invention is to enable the control system to achieve the reductions in the application time period and the application shocks of the starting clutch stably and independently of the operation conditions.

A third object of the invention is to free the control system substantially from the application shocks of the starting clutch.

In order to achieve the first object, according to the invention, there is provided a control system for a vehicular drive unit including an engine, a motor/generator, a transmission, and a planetary gear connected to the engine through a starting clutch and to the motor/generator and the transmission. The control system comprises motor drive means for driving the motor/generator in a predetermined direction prior to the application of the starting clutch at a split starting time of a vehicle, when the starting clutch is applied to interlock the engine and the motor/generator through the planetary gear to output a reaction of an engine output torque to the motor/generator.

In order to achieve the second object, the motor drive means changes the drive force of the motor/generator in accordance with an inertia torque of the motor/generator.

In order to achieve the third object, the motor drive means changes the drive force of the motor/generator such that the RPM of a rotary component of the planetary gear, as connected to the engine, may synchronize with the engine RPM.

BRIEF DESCRIPTION OF THE DRAWINGS

The invention will be described with reference to the drawings in which.

DESCRIPTION OF THE PREFERRED EMBODIMENTS

Figure 1:
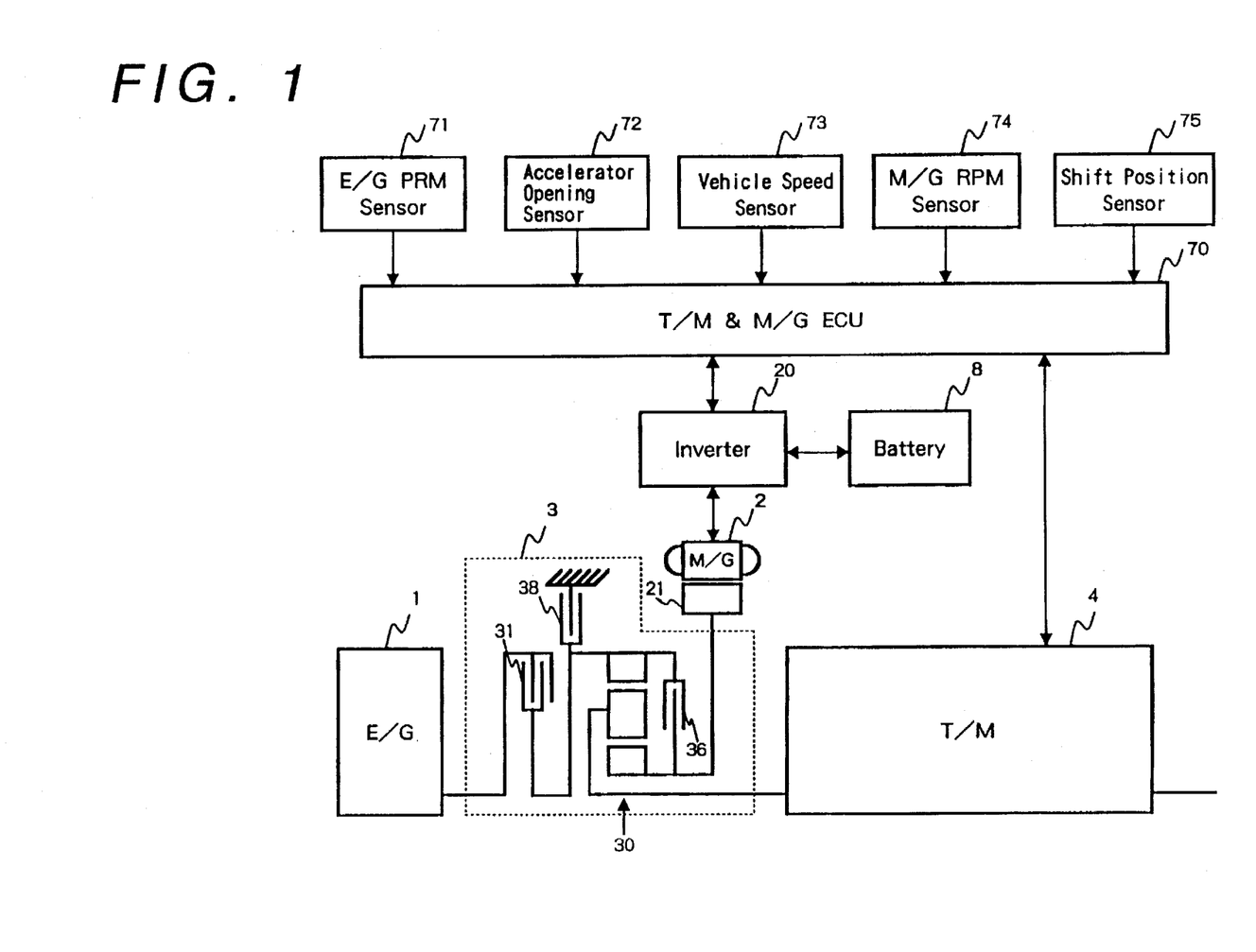
FIG. 1 is a block diagram showing a structure of a control system for a vehicular drive unit according to an embodiment of the invention.

An embodiment of the invention will be described in the following with reference to the accompanying drawings. FIG. 1 is a block diagram showing a structure of a control system of a vehicular drive unit. This drive unit is structured to include an engine (E/G) 1, a motor/generator (M/G) 2 of a permanent magnet synchronous motor type, a transmission (T/M) 4, and a power split unit 3. This power split unit 3 is composed of a planetary gear 30, two clutches 31 and 36 for controlling the planetary gear 30, and a brake 38.

The control system is structured to comprise a transmission and motor/generator control computer (T/M & M/G-ECU) 70 (as will be abbreviated into ECU) for controlling the motor/generator 2 through an inverter 20 and the power split unit 3 and the transmission 4 through the not-shown hydraulic control means. Further included, as information detecting means for the controls, are an engine RPM sensor 71, an accelerator opening sensor 72, a vehicle speed sensor 73, a motor/generator (M/G) RPM sensor 74 and a shift position sensor 75. Here, the motor/generator 2 is powered by a battery 8 and is controlled through the inverter 20. Moreover, the motor drive means according to the subject of the invention is structured as a program in the ECU 70, and its detail will be clarified in the description to be made with reference to flow charts.

Figure 2:
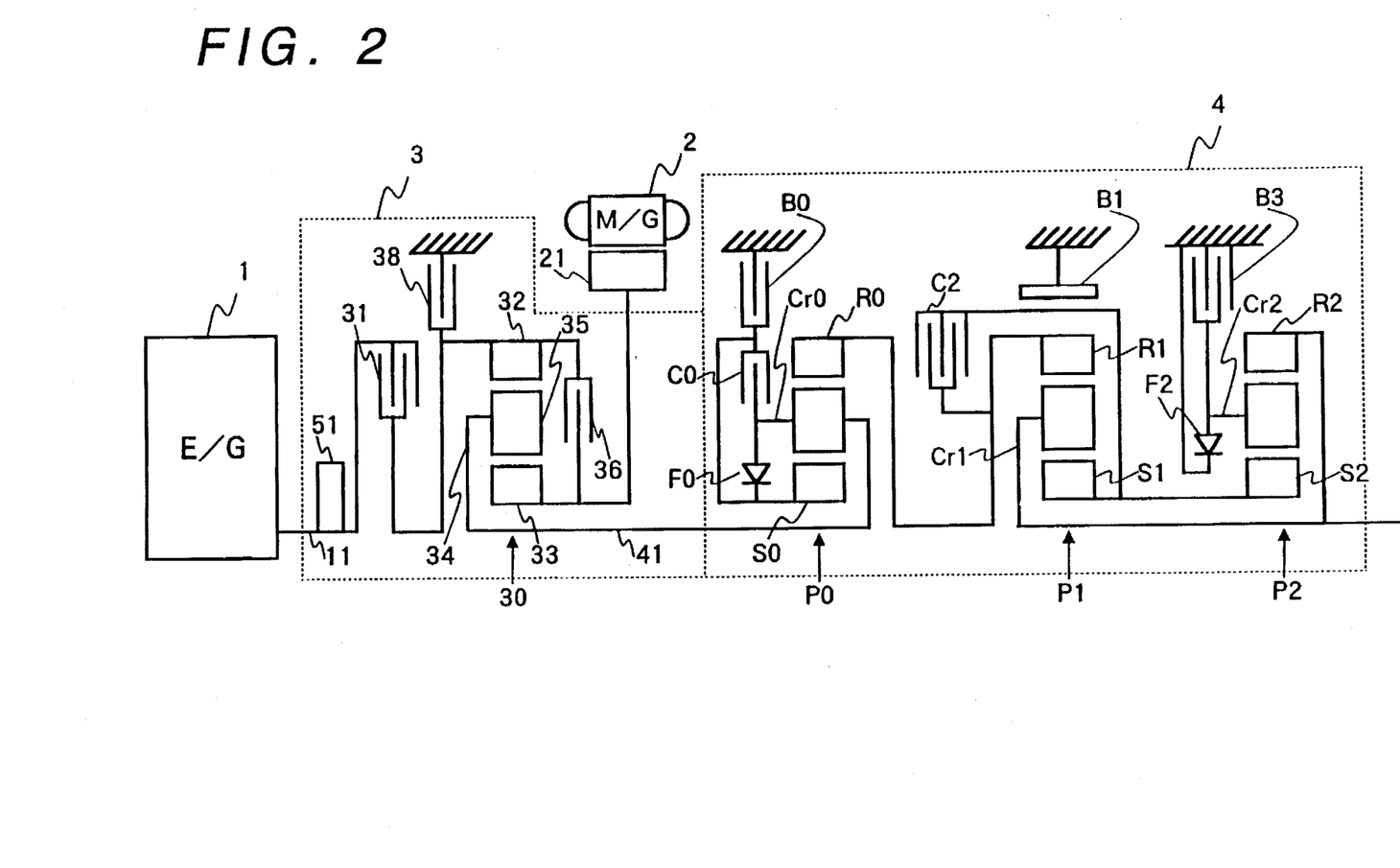
FIG. 2 is a skeleton diagram showing a power train of the vehicular drive unit.

FIG. 2 is a skeleton diagram showing the power train of the vehicular drive unit. The planetary gear 30 of the power split unit 3 has the simplest gear structure in that it has rotary elements composed of a ring gear 32, a sun gear 33, and a carrier 34 of a pinion gear 35 in meshing engagement with the two gears 32 and 33. Of these, the ring gear 32 is connected through the clutch 31 to the engine (E/G) 1; the sun gear 33 is connected to a rotor 21 of the motor/generator 2; and the carrier 34 is connected to an input shaft 41 of the transmission 4. Moreover, the direct clutch 36 is provided to connect/disconnect the ring gear 32 and the sun gear 33 so that the planetary gear 30 can be directly or epicyclically rotated. On the other hand, the ring gear 32 can be stopped by the reverse brake 38. To an input shaft 11 of the power split unit 3 connected to the engine 1, moreover, there is connected in a driven manner an oil pump 51 which provides a pressure source of the hydraulic control means.

The transmission 4 is structured as an automatic transmission having four speeds by combining a planetary gear (P0) providing an overdrive mechanism to be controlled by applying/releasing pluralities of clutches and brakes, with a transmission mechanism having three forward speeds to be controlled by applying/releasing pluralities of clutches and brakes. A carrier Cr0 and a sun gear S0 of the planetary gear (P0), as connected to the input shaft 41 of the transmission 41, are connected through a clutch C0 and a one-way clutch F0 in parallel. The sun gear S0 can be stopped by a brake B0. A ring gear R0, providing the output component of the planetary gear (P0), is connected to a ring gear R1 of the planetary gear (P1) and to a sun gear S2 through a clutch C2. The sun gear S2 and a ring gear R2 of the planetary gear (P2) are connected to a sun gear S1 and a carrier Cr1 of the planetary gear (P1), respectively. The ring gear R2 is the output component of the automatic transmission 4. Moreover, the two sun gears S1 and S2 can be stopped by a brake B1, and a carrier Cr2 of the planetary gear (P2) can be stopped by a one-way clutch F2 and a brake B3 in parallel.

Incidentally, it could be seen with reference to the power train of FIG. 2 that a neutral clutch for blocking the power in the transmission is omitted from the transmission 4 according to the present embodiment so as to simplify the mechanism. As a result, the torque, as outputted from the power split unit 3, is amplified by the gear ratio even at the 1st-speed gear stage at the starting time and is transmitted to the wheels to cause the shift shocks. A similar discussion can also be applied to the case in which the transmission is exemplified by a continuously variable transmission (e.g., a belt-type or a toroidal-type CVT).

Figure 4:
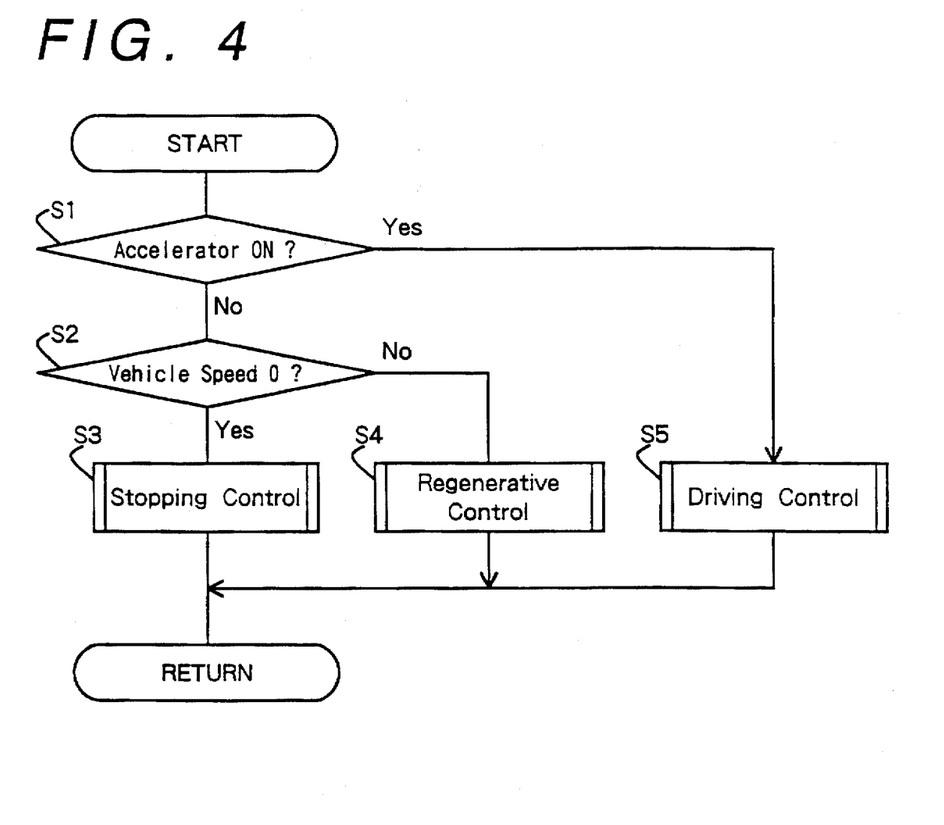
FIG. 4 is a flow chart showing a main routine by an ECU of the control unit.

Therefore, the control system of the present embodiment performs the control operations to be described hereafter. The control by the control system will be described in detail mainly with reference to the individual flow charts. FIG. 4 shows a vehicle controlling main routine. At first Step S1, it is determined on the basis of the information from the accelerator opening sensor 72 whether the accelerator pedal is operated (ON). If this decision is NO, it is determined at next Step S2, on the basis of the information from the vehicle speed sensor 75, whether the vehicle speed is at 0. If this decision is YES, it is determined that the vehicle is in the stop state, and the routine advances to a stopping control subroutine at Step S3.

Figure 5:
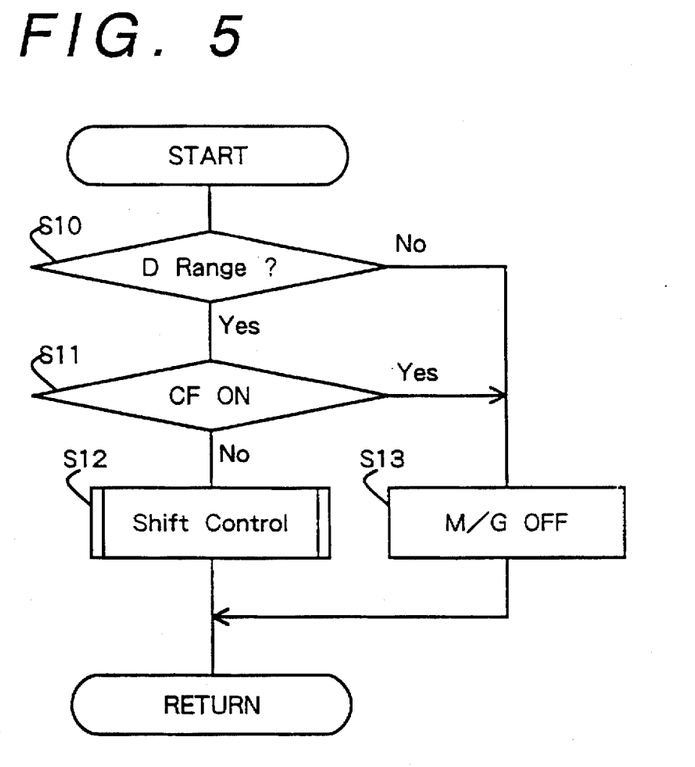
FIG. 5 is a flow chart showing a stopping control subroutine in the main routine.

When the stopping control subroutine shown in FIG. 5 is entered, it is determined at first Step S10, from the information of the shift position sensor, whether a "D"-range is selected, that is, it is determined, from the shift position, whether the driver intends to drive. If this determination is YES, it is determined at next Step S11 whether the starting clutch 31 is applied (ON) or not applied (OFF). If the starting clutch 31 has already been applied, the torque by the motor/generator (M/G) is not outputted at Step S13, and the routine is ended. Only if the starting clutch 31 is not applied (N), the shift controlling subroutine of Step S12 according to the subject of the invention is entered. Incidentally, even if it is determined at Step S10 that the "D"-range is not selected, the routine is naturally ended without outputting any torque by the motor/generator (M/G).

Figure 6:
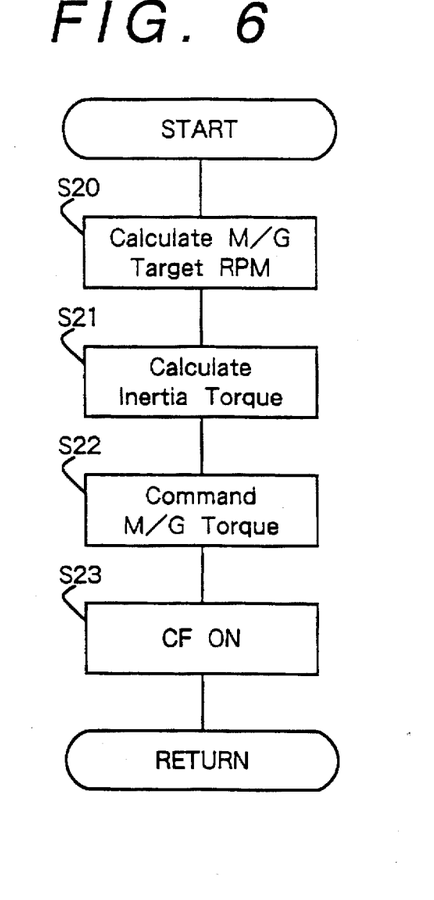
FIG. 6 is a flow chart showing a shift control subroutine in the stopping control subroutine.

When the shift control subroutine shown in FIG. 6 is entered, a target RPM of the motor/generator 2 is calculated at first Step S20 from an engine RPM (Ne), as actually measured by the engine RPM sensor 71, and the gear ratio of the planetary gear 30. At next Step S21, an inertial torque (Im·ω) from the target RPM of the motor/generator, the gear ratio of the planetary gear 30, an inertia moment (Im) relating to the rotor of the motor/generator, and a starting clutch applied time (ts). At next Step S22, a torque command to output a torque (Tm) corresponding to the inertia torque, as calculated at the preceding step, to the motor/generator (M/G) is issued to the inverter 20 so that a predetermined torque is outputted under the control of the electric current by the inverter 20. Thus, at final Step S23, the starting clutch (CF) is applied (ON).

Figure 7A:
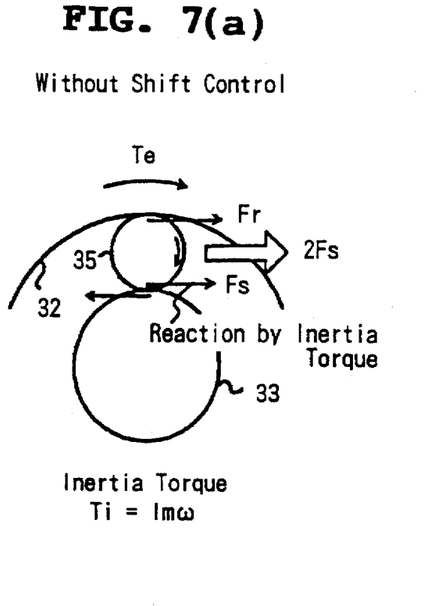
FIGS. 7(a)–(b) are operations explaining diagram illustrating the operation of a power split portion of the vehicular drive unit at the vehicle starting time.

The behavior of the planetary gear at the time of a shift control by the shift control subroutine will be described in comparison with the behavior without the control. Consider the torque balance, as indicated by "without shift control" in FIG. 7(a). When an engine torque (Te) is transmitted to the sun gear 33 in the irrotational state by applying the starting clutch 31 (as shown in FIG. 1) so that the ring gear 32 rotates clockwise, as shown, the pinion gear 35 will be rotated clockwise by a ring gear tangential force Fr but is not rotated by a reaction Fs, as caused by an inertia torque (Ti) of the sun gear 33 in the irrotational state. As a result, the pinion gear is revolved by the force of 2 Fs. This force is outputted to the carrier 34 supporting the pinion gear 35 to cause the shift shocks. If the reaction Fs exceeds the tangential force Fr, on the other hand, an engine stall is invited.

Figure 7B:
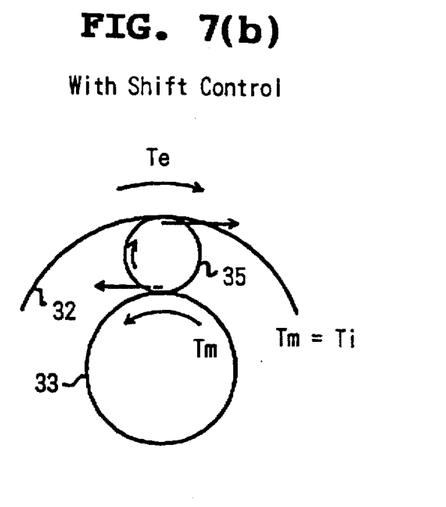

In the case of the torque balance indicated by "with shift control" in FIG. 7(b), on the contrary, the sun gear 33 is rotated counterclockwise by the output torque (Tm) of the motor/generator 2 so that the ring gear 32 is also rotated clockwise by the clockwise rotation of the pinion gear 35 with the carrier being fixed. As a result, even if the engine torque (Te) is transmitted to the ring gear 32 by applying the starting clutch 31, the transient unbalance, if any, between the two torques (Te and Tm) establishes the force to rotate the pinion gear 35, but no torque is outputted from the carrier.

Figure 8A:
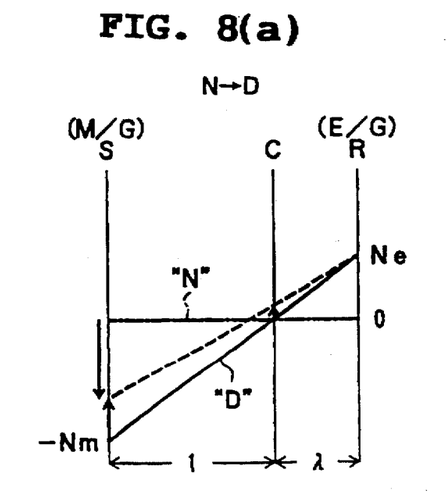
FIGS. 8(a)–(b) are speed diagrams illustrating the operations of the power split portion of the vehicular drive unit at the vehicle starting time.
Figure 8B:
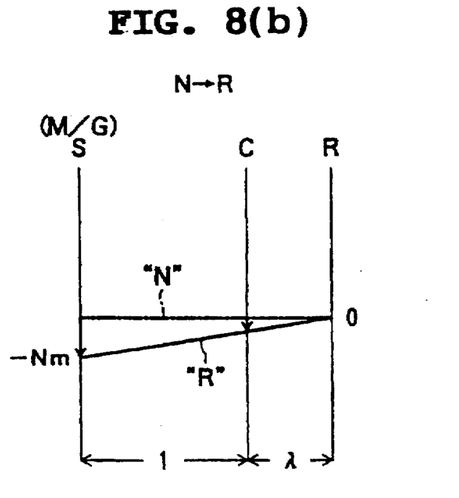

The reason why the shift shocks are caused from the behavior of the planetary gear at the start time is illustrated in speed diagrams in FIGS. 8(a)–(b). In the case of an N-D shift, as shown in FIG. 8(a), in the neutral "N" state at first, the individual rotary components of the planetary gear including a ring gear R, a carrier C and a sun gear S, as indicated by a single-dotted line, are in the stop state. When the starting clutch is applied in the state of the engine RPM Ne, the sun gear has to be instantly reversed to a backward rotation Nm, as indicated in the drive "D" state by a solid line, so as to establish a balance between the engine RPM Ne and the RPM of the synchronous ring gear R. Due to a delay in the rise of rotations by the inertia moment, however, there is established a RPM difference, as indicated by the dotted line. This RPM difference becomes a force for rotating the carrier C. For reference, there is illustrated a speed diagram of the case of the N-R shift as shown in FIG. 8(b). In this case, the motor/generator is rotated backward in the state of the applied direct clutch so that the carrier rotation rises with the rise in the sun gear rotation while leaving the problem of the inertia torque unraised.

Figure 9:
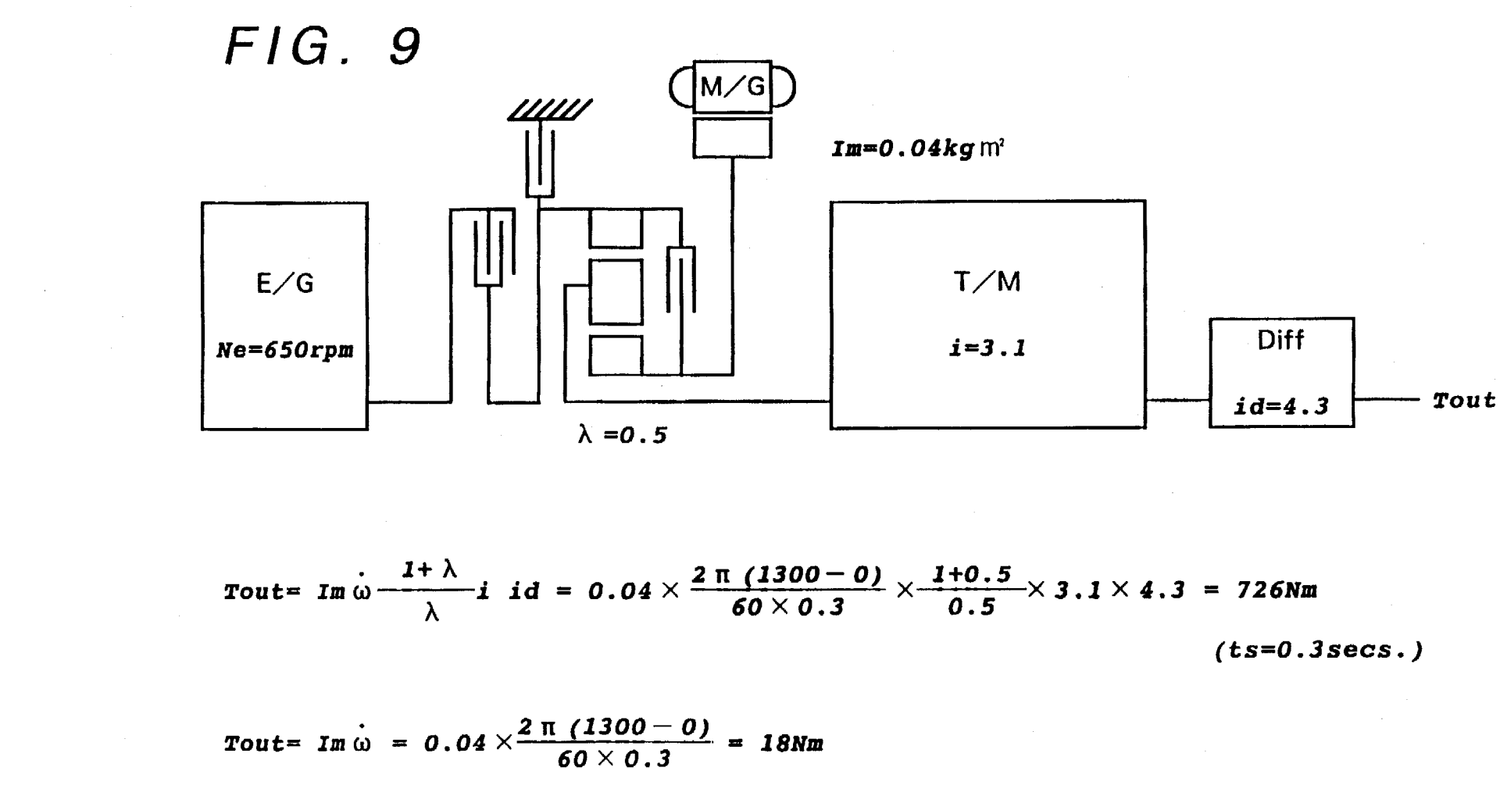
FIG. 9 is an explanatory diagram illustrating one embodiment of the control by a motor drive means together with the power train.

FIG. 9 illustrates the aforementioned shift control. In this example, an output torque (Tout) to be outputted to the wheels by the inertial torque is calculated for the case of the engine having an RPM Ne=650 rpm and the planetary gear 30 of the ring gear input, the sun gear reaction support and the carrier output, having a gear ratio setting of $\lambda=0.5$. The inertia moment Im around the motor/generator (M/G) including the sun gear is Im=0.04 Kgm$^2$, the 1st gear ratio i of the transmission (T/M) is i=3.1 and the gear ratio id of the differential gear is id=4.3. In the calculation formulas below the power train, the calculated value of the ± indicating the angular acceleration is set at the time when the shift time ts is set at 0.3 seconds according to that of an ordinary automatic transmission. As seen from this result, the output torque (Tout) takes a value of 726 Nm (or 72.6 Kgm), which is apparently larger than the value of about 250 Nm of the ordinary automatic transmission, so that engine stall may possibly occur. Thus, the drive of the motor/generator (M/G) is controlled with the drive torque Tm=18 Nm (or 1.8 Kgm) for canceling the inertia torque Im·ω in the aforementioned formula.

Reverting to FIG. 4, here will be briefly described the controls other than the stopping control. If the decision of the "accelerator ON" of Step S1 is YES (Y), the driving control routine of Step S5 is executed. Under this control, the engine 1, the motor/generator 2 and the power split unit 3 can be operated in the split mode, in the parallel hybrid mode, in the motor mode and in the engine mode. Specifically, at the driving time in the split mode to be executed subsequent to the shift control according to the subject of the invention, the starting clutch 31 is applied whereas the direct clutch 36 is released, and the engine 1 is kept at a predetermined rotation, so that the motor/generator (M/G) 2 is shifted from the power generation to the motor control as the vehicle speed rises. At this time, the engine output torque is inputted through the starting clutch 31 to the ring gear 32 of the planetary gear 30 so that the output torque according to the reaction torque support of the sun gear 33 by the motor/generator 2 is outputted from the carrier 34 to the transmission 4.

At the driving time in the parallel hybrid mode, on the other hand, both the starting clutch 31 and the direct clutch 36 are applied so that the motor/generator (M/G) 2 is controlled to generate the power or to act as the motor in accordance with the vehicle driving load relative to the engine output. At this time, the engine output torque is outputted to the transmission through the starting clutch 31 and the planetary gear 30, as directly connected, and the output torque of the motor/generator 2 is outputted to the transmission 4 through the planetary gear in the directly connected state.

At the driving time in the motor mode, the starting clutch 31 is released whereas the direct clutch 36 is applied so that the engine (E/G) 1 is controlled to rotate idly whereas the motor/generator (M/G) 2 is controlled to act as the motor. At this time, in the power train shown in FIG. 2, the output torque of the motor/generator 2 is transmitted to the transmission 4 through the planetary gear 30 in the directly connected state.

At the driving time in the engine mode, on the other hand, both the starting clutch 31 and the direct clutch 36 are applied. At this time, the output torque of the engine 1 is outputted to the transmission 4 through the starting clutch 31 and the planetary gear in the directly connected state.

If, on the other hand, the decision of the "vehicle speed 0" of Step S2 is NO (N) so that the decision of the driving is made although the accelerator is OFF, the control in the regenerative mode of Step S4 is executed. At the driving time in this regenerative mode, the starting clutch 31 is released whereas the direct clutch 36 is applied, so that the motor/generator (M/G) 2 is controlled to generate the power. At this time, the reverse drive torque to be transmitted from the wheels through the transmission 4 to the planetary gear 30 in the directly connected state is utilized as a braking force for the vehicle in accordance with the torque control of the motor/generator 2, as controlled to generate the power.

Figure 3:
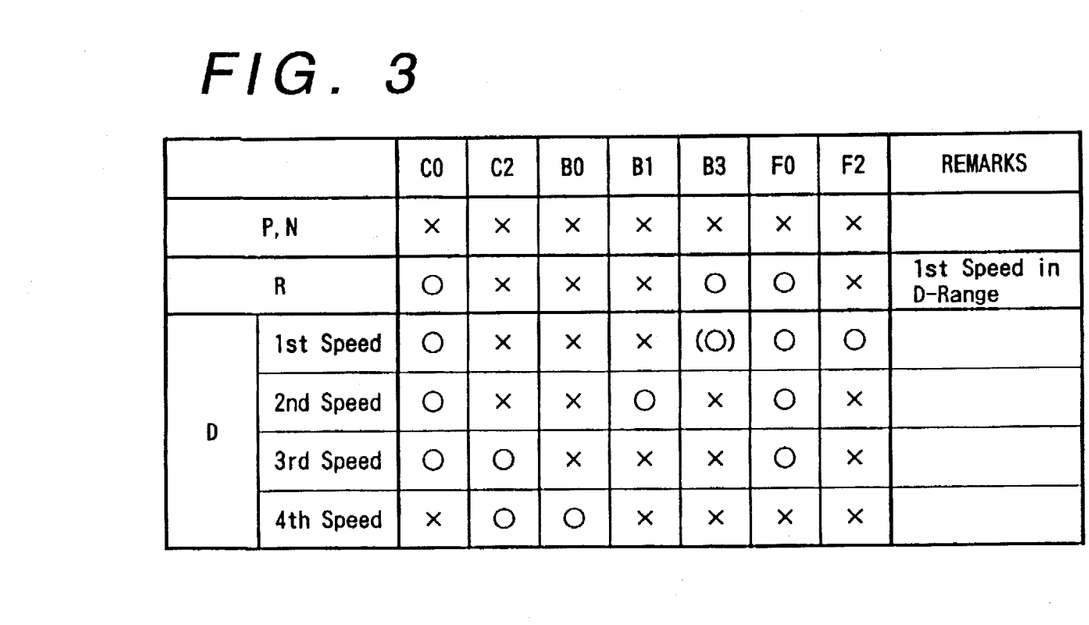
FIG. 3 is an application diagram of a transmission of the power train.

At the driving time in these individual modes, the torque to be transmitted from the planetary gear 30 to the transmission 4 is changed in speed as in the case of the ordinary automatic transmission until it is transmitted to the wheels to propel the vehicle. The operations of the individual frictional engaging components in the individual range positions and at the individual gear stages are tabulated in FIG. 3 so as to omit the description of the operations of the automatic transmission 4. In this Table: symbols o indicate the applied states of the clutches and brakes and the locked states of the one-way clutches; symbols x indicate the released states of the clutches and brakes and the free states of the one-way clutches; and a parenthesized (o) symbol indicates the applied state for the engine braking operation. Incidentally, since this transmission does not provide a reverse gear stage, the reverse ("R") gear stage is achieved by setting the transmission at the 1st-speed gear stage in the "D" range to reverse the motor/generator (M/G).

In the embodiment, as has been described in detail hereinbefore, the motor drive means drives the motor/generator 2 prior to the application of the starting clutch 31 in the direction for the motor/generator 2 to rotate after the starting clutch is applied, that is, in the reverse direction so that the inertia torque, which might otherwise be caused by the delay in the rise of the rotation of the motor/generator 2, can be essentially reduced. Since, moreover, the inertia toque is considerably reduced, the application time period is not elongated even if the application pressure of the automatic transmission of the prior art is controlled. Since, moreover, the motor drive means calculated the target RPM to change the driving force of the motor/generator 2 in accordance with the inertia torque, as anticipated to occur, neither the application shocks are enlarged nor the application time period elongated even when the engine RPM is raised by the warming-up to raise the inertia torque. Still moreover, the motor drive means changes the driving force of the motor/generator 2 such that the RPM of the ring gear 32 of the planetary gear 34, as connected to the engine 1 by applying the starting clutch 31, may De synchronized with the engine RPM. As a result, when the starting clutch 31 is applied, the RPM of the motor/generator 2 takes the specified value so that the application shocks can be essentially eliminated.

Although the invention has been described in detail above, it should not be limited to the embodiment but could be embodied in various manners by changing the specific construction within the scope of the appended claims. For example, between Step S22 and Step S23 of the shift control, as has been described with reference to FIG. 6, the RPM of the motor/generator 2 could be monitored by the motor/generator RPM sensor 74 so that the control might be conducted to apply the starting clutch 31 after the target RPM has been confirmed. In this modification, the shift shocks can be completely eliminated if the error in the control accuracy is ignored.

According to the invention, the motor drive means drives the motor/generator in the predetermined direction (i.e., in the negative direction, in which the motor/generator rotates after the starting clutch has been applied) prior to the application of the starting clutch at a split starting time of a vehicle, when the starting clutch is applied to interlock the engine and the motor/generator through the planetary gear to output a reaction of an engine output torque to the motor/generator. As a result, it is possible to essentially reduce the occurrence of the inertia torque which might otherwise be caused due to the delay of the rise in the rotation of the motor/generator. Since the inertia torque is thus reduced, on the other hand, the application time period is not elongated even in the case of a control similar to that of the application pressure of the automatic transmission of the prior art.

According to the invention, moreover, the motor drive means changes the drive force of the motor/generator in accordance with an inertia torque to be generated. As a result, neither the application shock nor the application time period is enlarged even at the start under the condition in which the engine RPM is raised during a warming-up to increase the inertia torque.

According to the invention, still moreover, the motor drive means changes the drive force of the motor/generator such that the RPM of a rotary component of the planetary gear, as connected to the engine by the application of the starting clutch, may synchronize with the engine RPM. As a result, at the application time of the starting clutch, the RPM of the motor/generator can be regulated to essentially eliminate the application shocks.

What is claimed is:

1. A control system for a drive unit of a vehicle comprising:

an engine;

a motor/generator;

a transmission;

a planetary gear connected to said engine through a starting clutch, to said motor/generator and to said transmission; and a motor drive controller driving said motor/generator in a predetermined direction prior to the application of said starting clutch at a split starting time of the vehicle, when said starting clutch is applied to interlock said engine and said motor/generator through said planetary gear to output a reaction of an engine output torque to said motor/generator.

2. The control system for a vehicular drive unit according to claim 1, wherein said motor drive controller changes the drive force of said motor/generator in accordance with an inertia torque of said motor/generator.

3. The control system for a vehicular drive unit according to claim 2, wherein said motor drive controller changes the drive force of said motor/generator such that the RPM of a rotary component of said planetary gear, as connected to said engine, synchronizes with the engine RPM.

4. A control system for a vehicular drive unit of a vehicle comprising:

engine means for supplying driving power to said vehicle;

motor/generator means for driving the engine in a drive state and generating electric power in a driven state;

transmission means for driving wheels of said vehicle;

planetary gear means for connecting said engine, through a starting clutch, to said motor/generator means and to said transmission means;

motor drive means for driving said motor/generator means in a predetermined direction prior to the application of said starting clutch at a split starting time of a vehicle, when said starting clutch is applied to interlock said engine means and said motor/generator means through said planetary gear means to output a reaction of an engine means output torque to said motor/generator means.

5. The control system for a vehicular drive unit according to claim 4, wherein said motor drive means changes the drive force of said motor/generator means in accordance with an inertia torque of said motor/generator means.

6. The control system for a vehicular drive unit according to claim 5, wherein said motor drive means changes the drive force of said motor/generator means such that the RPM of a rotary component of said planetary gear means, as connected to said engine means, synchronizes with the engine means RPM.

7. A method of controlling a vehicular drive unit of a vehicle comprising the steps of:

supplying driving power to said vehicle with an engine;

driving the engine in a drive state and generating electric power from said engine in a driven state with a motor/generator;

driving the wheels of said vehicle with a transmission of said vehicle;

connecting said engine, through a starting clutch, to said motor/generator and to said transmission with a planetary gear;

driving said motor/generator in a predetermined direction prior to the application of said starting clutch at a split starting time of the vehicle, when said starting clutch is applied to interlock said engine and said motor/generator through said planetary gear to output a reaction of an engine output torque to said motor/generator.

8. The method of controlling a vehicular drive system according to claim 7, wherein the step of driving said motor/generator further includes changing the drive force of said motor/generator in accordance with an inertia torque of said motor/generator.

9. The method of controlling a vehicular drive system according to claim 8, wherein the step of driving said motor/generator further includes changing the drive force of said motor/generator such that the RPM of a rotary component of said planetary gear, as connected to said engine, synchronizes with the engine RPM.

* * * * *